Figure 1:
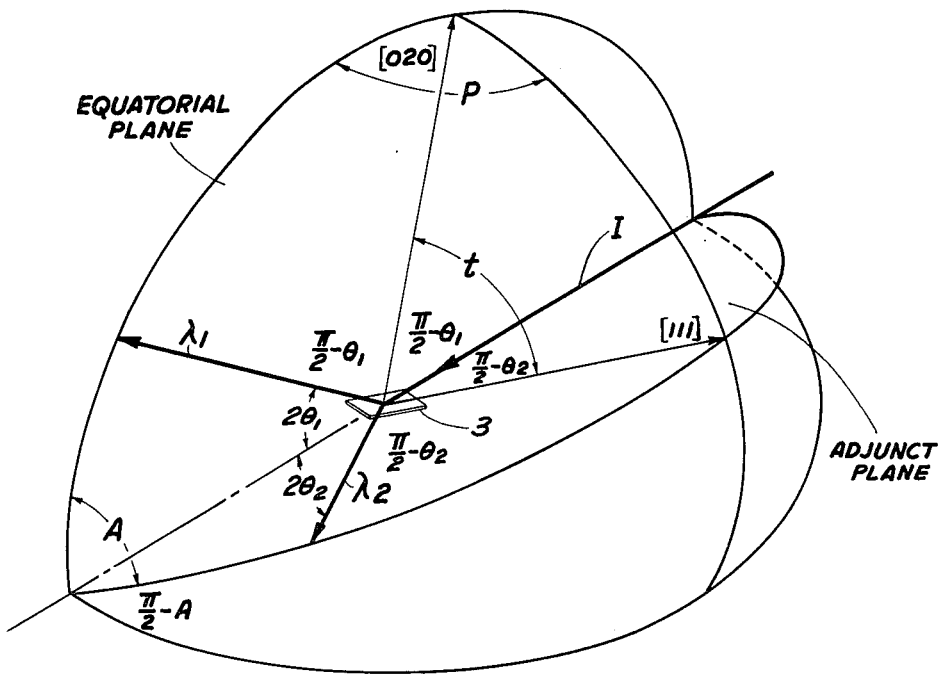

INVENTOR.
NATHAN SPIELBERG

United States Patent Office 3,213,278
Patented Oct. 19, 1965

3,213,278
X-RAY SPECTROGRAPH HAVING PLURAL DETECTORS
Nathan Spielberg, Hartsdale, N.Y., assignor to North American Philips Company, Inc., New York, N.Y., a corporation of Delaware
Filed Apr. 13, 1962, Ser. No. 187,271
5 Claims. (Cl. 250—51.5)

My invention relates to an X-ray spectrograph and more particularly to an X-ray spectrograph which measures more than one element simultaneously rather than serially.

In a copending application Serial No. 771,621, filed November 3, 1958, now U.S. Patent No. 3,046,399, there is described an X-ray spectrograph for detecting the presence of a plurality of elements in a specimen simultaneously rather than serially. In the spectrograph there is described one specially cut and oriented crystal which is employed to simultaneously diffract different wave-lengths, corresponding to the wave-lengths of characteristic X-rays emitted by the elements in the specimen when suitably excited, to a plurality of X-ray detectors each of which is so positioned as to detect a single wave-length corresponding to its position.

The simultaneous detection of a plurality of wave-lengths of X-radiation using a stationary crystal and stationary detectors was a significant departure from the more conventional method of employing a rotatable crystal and a synchronously rotatable detector for detecting each wave-length separately and serially. In the earlier method, the analyzing crystal reflected X-rays at a particular angle $\theta$ determined by the wave-length $\lambda$ and interplanar spacing $d$ of the crystal in accordance with Bragg's law, which states:

$$n\lambda = 2d \sin \theta$$

where $n$ is the order of reflection. Since $d$ is fixed and known from the crystal, and $2\theta$, twice the angle of reflection can be measured by mounting the detector on a calibrated circular arc, it follows that for each wave-length $\lambda$, the detector and crystal must rotate to locate a reflection and measure the angle. Thus, by measuring the angle of reflection, the wave-length can be determined, and since each element emits X-rays having a specific, or characteristic wave-length when suitably excited, a reflection at a particular angle determined the presence of that element in the specimen. If several elements are present in the specimen, the entire angular range must be scanned and measurements made serially at each angle corresponding to a wave-length characteristic of each element.

The earlier filed application discloses the principle for orienting the detectors relative to the crystal and the procedure to determine in each case where the detectors must be located to detect a wave-length corresponding to each element in the specimen. Thus, the principle used to cause simultaneous diffraction into N detectors is governed by satisfying the Laue condition for N characteristic radiations and at least N sets of crystallographic planes, $(hkl)$. The simultaneous diffraction from N planes $(hkl)$ corresponding to N characteristic wave-lengths $\lambda_n$ is accomplished by orienting a specially cut crystal in the following manner.

The three-dimensional reciprocal lattice of the crystal is constructed (see, for example, X-ray Crystallography, M. J. Buerger, Chapter 6, p. 107 et seq.). N spheres, each of radius $1/\lambda_j$ ($\lambda_j$ being the characteristic wave-length of the $j$th element, $j=1, 2, 3, \ldots n$) are constructed with a common point of tangency. The common point of tangency of the N spheres is made to coincide with the origin of the reciprocal lattice. With the reciprocal lattice fixed in space, the line of centers of the spheres is rotated about any line drawn through the origin of the reciprocal lattice. When each and every sphere intersects, or nearly intersects with one reciprocal lattice point, the condition of simultaneous diffraction is satisfied; all planes $(hkl)$ represented by reciprocal lattice points are respectively in reflecting positions for the wave-lengths characterized respectively by the spheres; the direction of the line of centers is the direction of the incident beam and the orientation of the reciprocal lattice to this direction defines the orientation of the crystal relative to the direction of the incident beam. The directions of radii drawn from intersections of spheres and reciprocal lattice points define the directions in which the detectors must point to receive the diffracted rays.

The present invention is an improvement in the spectrograph disclosed in the earlier application. The invention provides a convenient means for orienting the detectors relative to the crystal.

According to the invention, the central ray of any wave-length reflected by the crystal may be characterized as being deflected through an angle $2\theta$ from its incident direction and lying in a plane called the adjunct plane which makes an angle A with a principal plane, hereinafter referred to as the equatorial plane. Consequently, the detectors may be placed on mounting members pivotable about a common center line which is coincident with the central ray of the incident beam. Each mounting member is adjusted to make the proper angle A with the equatorial plane, and each detector is set to the proper angle $2\theta$ with respect to the central ray of the incident beam.

Figure 2:
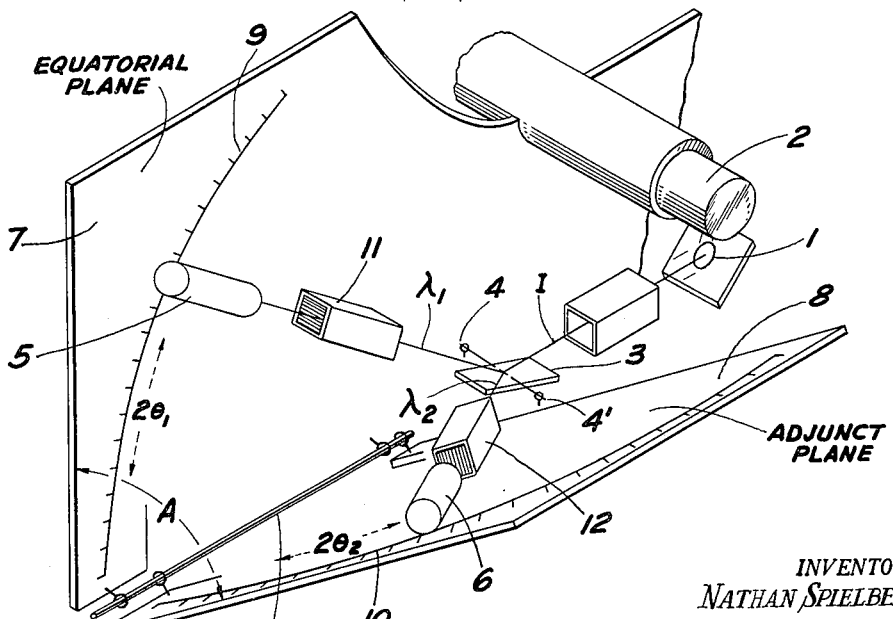

The invention will be described with reference to the accompanying drawing in which:

FIG. 1 shows the principle of multiple reflections from a reflecting crystal to permit simultaneous detection of more than one element in a specimen; and FIG. 2 shows an X-ray spectrograph embodying the principle of multiple reflections from a crystal to a plurality of stationary detectors to determine the constituents present in the specimen.

Thus, referring to FIG. 1, the central ray of an incident X-ray beam I, containing a plurality of wave-lengths each of which corresponds to a characteristic wave-length emitted by an element in the specimen when suitably excited, is shown impinging on a crystal where the several wave-lengths are diffracted as $\lambda_1$, $\lambda_2$, etc. (only two of which are shown for the sake of simplicity) through angles of $2\theta_1$, $2\theta_2$, etc., respectively, with respect to the incident ray I.

The central ray of the incident beam I and the central ray of the diffracted beam $\lambda_1$ lie in one plane, which will be referred to as the equatorial plane; and the central ray of the incident beam I and the central ray of the diffracted beam $\lambda_2$ lie in an adjunct plane which forms an angle A with the equatorial plane.

Furthermore, to separate the incident ray I into its component wave-lengths, reflections must take place from at least two diffracting planes in the crystal which for the purpose of illustration have been chosen as the [020] and [111] planes for a LiF crystal; the normal to the [020] planes lies in the equatorial plane and the normal to the [111] planes lies in the adjunct plane. Consequently, the crystal must be oriented with respect to the equatorial and adjunct planes so that the plane containing the normals to the [020] and [111] planes forms an angle P with the equatorial plane.

A and P are determined from the following formulae:

$$\cos A = \frac{\cos t - \sin \theta_1 \sin \theta_2}{\cos \theta_1 \cos \theta_2}$$

$$\cos P = \frac{\cos t \sin \theta_1 - \sin \theta_2}{\sin t \cos \theta_1}$$

where $t$ is the angle between the normals to the two reflecting planes and is known from the crystal structure, and $\theta_1$ and $\theta_2$ are half the reflection angles of each of the diffracted rays $\lambda_1$ and $\lambda_2$, respectively.

A device for instrumenting the geometry of FIGURE 1 is shown in FIG. 2 in which a specimen 1 is mounted for exposure to a beam of X-rays generated by an X-ray tube 2. The X-ray beam contains wave-lengths short enough to excite elements in the specimen to fluoresce or generate characteristic X-rays, which are reflected by a specially cut diffracting crystal 3 pivotable about a pair of gimbals. One axis 4, 4' is perpendicular to the equatorial plane, and the other axis (not shown in the figure) is parallel to the normal to the crystallographic planes used to obtain the reflection lying in the equatorial plane (e.g., parallel to [020], as in FIG. 1). The diffracting crystal is cut in the manner described in the aforesaid application 771,621, incorporated herein by reference.

Two detectors 5, 6 are positioned on mounting boards 7, 8 respectively, each of which is provided with a calibrated arc 9, 10. Between each detector and the crystal, collimators 11, 12 are provided to limit the divergence of the reflected X-rays from the diffracting crystal 3. The mounting boards 7, 8 are hinged for rotation about rod 13, the axis of which is coincident with the central ray of the X-ray incident upon the crystal 3.

Since the various wave-lengths reflected by crystal 3 may be characterized as being deflected through an angle $2\theta$ from their incident direction, if one wave-length is received in a principal or equatorial plane which is parallel to the mounting surface of board 7, the other wave-length lies in a plane making an angle A with the equatorial plane, or parallel to the plane of the mounting board 8. Each detector 5, 6 and its associated collimator must also point at the crystal and form an angle $2\theta$ with the incident beam. The latter angle, of course, is determined by the position of the detectors in the corresponding calibrated arcs 9, 10: as $2\theta_1$, and $2\theta_2$ respectively.

In addition, the diffracting crystal 3 must be properly oriented for the reflections. When the crystal is properly oriented, the equatorial plane makes an angle P with the plane which contains the normals of the two diffracting planes employed as shown in FIG. 1.

The only adjustments that are required then are those of setting the proper values of $2\theta$ and A, for each board and of the proper value of P for the crystal orientation used, i.e. $2\theta$ is fixed by locating each detector along its associated calibrated arc; A is fixed by rotating the mounting boards; $\theta_1$ is set for the crystal by rotation about 4, 4'; and P is fixed by rotating the crystal about the normal to the diffraction plane for $\lambda_1$ on its gimbals. When these adjustments are made, $\theta_2$, $\theta_3$, etc., are automatically set.

The above-described instrument greatly simplifies the location of the detectors with respect to the diffracting crystal since all mounting boards may be made more or less identically, and are easily and simply installed.

It should also be noted that instead of an X-ray tube, the specimen could be exposed directly to an electron beam of sufficient intensity to generate characteristic X-rays, or it could be exposed to a radioactive source.

Accordingly, the invention is not limited to the sole embodiment described herein since other modifications will be obvious to those skilled in the art without departing from the spirit and scope of the invention.

What I claim is:

1. An X-ray spectrograph for determining the elemental composition of a specimen of material comprising means to excite constituent elements of a specimen of material to produce characteristic X-rays, a diffracting crystal positioned to receive the characteristic X-rays from the specimen, said crystal being cut and oriented to diffract radiation of plurality of wave-lengths each of which corresponds to one of said elements in said specimen from a plurality of deflecting planes within said diffracting crystal, a plurality of detectors each of which detects one of said wave-lengths corresponding to one of said elements in said material, and means for positioning said detectors to separately and simultaneously detect each of said wave-lengths, said latter means including a plurality of members each having a substantially planar surface upon which one of said detectors is positioned, said members being pivotally mounted about an axis coincident with a central ray of the X-ray beam incident upon the diffracting crystal, the planar surface of one of said members being parallel to a principal or equatorial plane and the planar surfaces of said other members each being parallel to an adjunct plane, each of said adjunct planes forming an angle A with said equatorial plane such that $$\cos A = \frac{\cos t - \sin \theta_1 \sin \theta_2}{\cos \theta_1 \cos \theta_2}$$

where $\theta_1$ is the Bragg angle of reflection in the equatorial plane and $\theta_2$ is the Bragg angle of reflection in said adjunct plane, and $t$ is the angle between normals of the two diffracting planes employed in determining $\theta_1$ and $\theta_2$ which normals lie respectively in the equatorial and adjunct planes, said normals also defining a plane forming an angle P with the equatorial plane such that $$\cos P = \frac{\cos t \sin \theta_1 - \sin \theta_2}{\sin t \cos \theta_1}$$

2. An X-ray spectrograph as defined in claim 1 in which the diffracting crystal is mounted on gimbals whereby the crystal can be oriented to select a set of reflecting planes.

3. An X-ray spectrograph as defined in claim 1 in which each member for supporting a detector is provided with a graduated arc for pointing the detector toward the crystal.

4. An X-ray spectrograph as defined in claim 1 in which the members are hinged for rotation about a supporting rod the axis of which is coincident with the central incident ray.

5. An X-ray spectrograph as defined in claim 1 in which the means for exciting the constituent elements of the specimen to produce X-ray is an X-ray source.

References Cited by the Examiner

UNITED STATES PATENTS

| | | | |
|---|---|---|---|
| 2,819,405 | 1/58 | Bond | 250—51.5 |
| 2,928,945 | 3/60 | Arndt et al. | 250—51.5 |
| 3,030,507 | 4/62 | Khol | 250—51.5 |
| 3,046,399 | 7/62 | Ladell | 250—51.5 |

RALPH G. NILSON, *Primary Examiner.*

UNITED STATES PATENT OFFICE
CERTIFICATE OF CORRECTION

Patent No. 3,213,278                            October 19, 1965

Nathan Spielberg

It is hereby certified that error appears in the above numbered patent requiring correction and that the said Letters Patent should read as corrected below.

In the grant (only), line 1, for "Nathan Spielbert" read -- Nathan Spielberg --; column 1, line 19, strike out "is"; same line 19, strike out "which"; column 4, line 21, for "deflecting" read -- reflecting --.

Signed and sealed this 31st day of May 1966.

(SEAL)

Attest:

ERNEST W. SWIDER                            EDWARD J. BRENNER

Attesting Officer                              Commissioner of Patents